(12) United States Patent
Gordon et al.

(10) Patent No.: US 8,191,104 B2
(45) Date of Patent: *May 29, 2012

(54) METHOD AND APPARATUS FOR PROVIDING INTERACTIVE PROGRAM GUIDE (IPG) AND VIDEO-ON-DEMAND (VOD) USER INTERFACES

(75) Inventors: Donald F. Gordon, Los Altos, CA (US); Sadik Bayrakeri, Foster City, CA (US); Jeremy S. Edmonds, Redwood City, CA (US); Yong Ho Son, Palo Alto, CA (US); Edward A. Ludvig, Redwood City, CA (US); Mike R Colligan, Sunnyvale, CA (US)

(73) Assignee: Cox Communications, Inc., Atlanta, GA (US)

( * ) Notice: Subject to any disclaimer, the term of this patent is extended or adjusted under 35 U.S.C. 154(b) by 1054 days.

This patent is subject to a terminal disclaimer.

(21) Appl. No.: 11/542,419

(22) Filed: Oct. 3, 2006

(65) Prior Publication Data

US 2007/0033631 A1 Feb. 8, 2007

Related U.S. Application Data

(63) Continuation of application No. 09/740,735, filed on Dec. 18, 2000, now Pat. No. 7,124,424.

(60) Provisional application No. 60/253,417, filed on Nov. 27, 2000.

(51) Int. Cl.
*H04N 7/16* (2011.01)

(52) U.S. Cl. ......... 725/151; 725/144; 725/147; 725/152

(58) Field of Classification Search ........................ None
See application file for complete search history.

(56) References Cited

U.S. PATENT DOCUMENTS

| 5,410,698 | A | * | 4/1995 | Danneels et al. | ............. 719/331 |
| 5,416,508 | A | | 5/1995 | Sakuma et al. | |
| 5,592,551 | A | | 1/1997 | Lett et al. | |
| 5,596,373 | A | | 1/1997 | White et al. | |
| 5,751,282 | A | | 5/1998 | Girard et al. | |
| 5,818,438 | A | | 10/1998 | Howe et al. | |
| 5,838,314 | A | | 11/1998 | Neel et al. | |
| 5,850,218 | A | * | 12/1998 | LaJoie et al. | ..................... 725/45 |
| 5,978,912 | A | * | 11/1999 | Rakavy et al. | ..................... 713/2 |
| 6,005,561 | A | | 12/1999 | Hawkins et al. | |
| 6,163,345 | A | | 12/2000 | Noguchi et al. | |

(Continued)

FOREIGN PATENT DOCUMENTS

EP 000721253 10/1996

*Primary Examiner* — Joseph P Hirl
*Assistant Examiner* — An Nguyen
(74) *Attorney, Agent, or Firm* — Merchant & Gould

(57) ABSTRACT

An apparatus for providing multiple session-based services at a terminal, an exemplary apparatus includes a memory configured to support a plurality of software layers including a service layer communicating with terminal resources via a root layer disposed therebetween; and a processor, for executing instructions associated with a plurality of service layer applications, a root layer application and a control mechanism; each of the service layer applications communicating with terminal resources to provide thereby a respective user interface; wherein the control mechanism selectively causing at least one of the service layer applications to enter an active state, the user interface associated with a service layer application being adapted in response to the service layer application entering the active state.

18 Claims, 11 Drawing Sheets

U.S. PATENT DOCUMENTS

| | | |
|---|---|---|
| 6,236,365 B1 * | 5/2001 | LeBlanc et al. ............... 342/457 |
| 6,279,029 B1 | 8/2001 | Sampat et al. |
| 6,300,951 B1 | 10/2001 | Filetto et al. |
| 6,378,036 B2 | 4/2002 | Lerman et al. |
| 6,415,437 B1 * | 7/2002 | Ludvig et al. ................... 725/41 |
| 6,426,779 B1 | 7/2002 | Noguchi et al. |
| 6,442,599 B1 | 8/2002 | DuLac et al. |
| 6,687,735 B1 | 2/2004 | Logston et al. |
| 2002/0054062 A1 * | 5/2002 | Gerba et al. .................. 345/716 |
| 2004/0226042 A1 | 11/2004 | Ellis |

* cited by examiner

METHOD AND APPARATUS FOR PROVIDING INTERACTIVE PROGRAM GUIDE (IPG) AND VIDEO-ON-DEMAND (VOD) USER INTERFACES

CROSS-REFERENCES TO RELATED APPLICATIONS

This application is a continuation of U.S. patent application Ser. No. 09/740,735, entitled METHOD AND APPARATUS FOR PROVIDING INTERACTIVE PROGRAM GUIDE (IPG) AND VIDEO-ON-DEMAND (VOD) USER INTERFACES, filed Dec. 18, 2000 now U.S. Pat. No. 7,124,424, which application claims the benefit of U.S. provisional Application Ser. No. 60/253,417, entitled "METHOD AND APPARATUS FOR INTERACTIVE PROGRAM GUIDE AND ADVERTISING SYSTEM," filed Nov. 27, 2000; both prior applications are incorporated herein by reference in their entireties for all purposes.

BACKGROUND OF THE INVENTION

The present invention relates to communication systems in general. More specifically, the invention relates to techniques to efficiently deliver interactive program guide (IPG) and other multimedia information in a server-centric system.

Over the past few years, the television industry has seen a transformation in a variety of techniques by which its programming is distributed to consumers. Cable television systems are doubling or even tripling system bandwidth with the migration to hybrid fiber coax (HFC) cable plant. Direct broadcast satellite (DBS) systems have also emerged as a viable alternative to customers unwilling to subscribe to local cable systems. A variety of other approaches have also been attempted, which focus primarily on high bandwidth digital technologies, intelligent two-way set top terminals, or other methods to try to offer services differentiated from those of standard cable and over-the-air broadcast systems.

With the increase in bandwidth, the number of programming choices has also increased. Leveraging off the availability of more intelligent set top terminals (STTs), several companies have developed elaborate systems for providing an interactive listing of a vast array of channel offerings, expanded textual information about individual programs, and the ability to look forward as much as several weeks in advance to plan television viewing.

Unfortunately, the existing program guides have several drawbacks. First, these guides tend to require a significant amount of memory at the set top terminal. Second, the terminals may be very slow to acquire the current database of programming information when they are turned on for the first time or are subsequently restarted (e.g., a large database may be downloaded to a terminal using only a vertical blanking interval (VBI) data insertion technique). Such slow database acquisition may disadvantageously result in out of date information or, in the case of services such as pay-per-view (PPV) or video-on-demand (VOD), limited scheduling flexibility for the information provider. Third, the user interface of existing program guides do not usually look like a typical television control interface; rather the user interface looks like a 1980's style computer display (i.e., having blocky, ill-formed text and/or graphics).

For a system designed to offer a number of services (e.g., interactive program guide, video-on-demand, and so on) to a large number of terminals, it is highly desirable to provide user interfaces that support and facilitate the delivery and use of these services.

SUMMARY OF THE INVENTION

The invention provides an apparatus for providing multiple session-based services at a terminal. An exemplary apparatus includes a memory configured to support a plurality of software layers including a service layer communicating with terminal resources via a root layer disposed therebetween; and a processor, for executing instructions associated with a plurality of service layer applications, a root layer application and a control mechanism; each of the service layer applications communicating with terminal resources to provide thereby a respective user interface; wherein the control mechanism selectively causing at least one of the service layer applications to enter an active state, the user interface associated with a service layer application being adapted in response to the service layer application entering the active state.

The invention further provides other methods, computer readable media and system elements that implement various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

The teachings of the invention can be readily understood by considering the following detailed description in conjunction with the accompanying drawings.

To facilitate understanding, identical reference numerals have been used, where possible, to designate identical elements that are common within a figure.

DESCRIPTION OF THE SPECIFIC EMBODIMENTS

A. System

Figure 1:
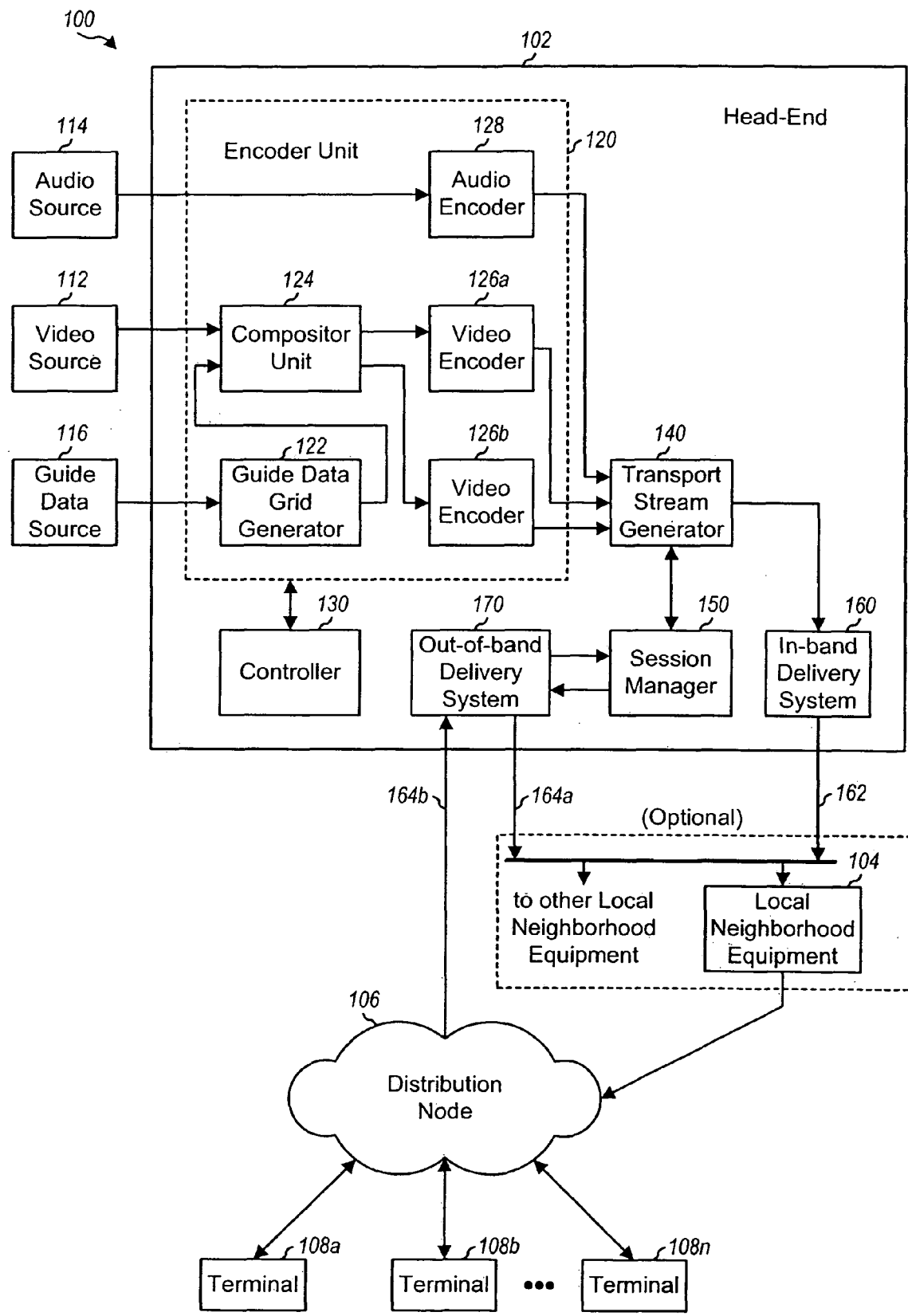
FIG. 1 is a block diagram of an embodiment of an information distribution system that can be used to provide interactive program guide (IPG) and is capable of implementing various aspects of the invention.

FIG. 1 is a block diagram of an embodiment of an information distribution system 100 that can be used to provide interactive program guide (IPG) and is capable of implementing various aspects of the invention. Distribution system 100 includes a head-end 102, (optional) local neighborhood equipment (LNE) 104, one or more distribution nodes 106 (e.g., a hybrid fiber-coax network), and a number of terminals 108 (e.g., set top terminals). Each LNE 104 may serve one or more distribution nodes 106, and each distribution node 106 is typically associated with a respective neighborhood that includes a number of terminals 108.

Head-end 102 produces a number of digital streams that contain encoded information in (e.g., MPEG-2) compressed format. These digital streams are then modulated using a modulation technique that is compatible with a communication channel 162 that couples head-end 102 to LNE 104 and/or distribution node 106. LNE 104 is typically located away from head-end 102. LNE 104 selects data for viewers in the LNE's neighborhood and re-modulates the selected data into a form suitable for transmission to the associated distribution node(s) 106. Although system 100 is depicted as having head-end 102 and LNE 104 as separate elements, the functions of LNE 104 may be incorporated into head-end 102. Also, the elements of system 100 can be physically located anywhere, and need not be near each other.

In distribution system 100, program streams may be continually transmitted from the head-end to the terminals (i.e., broadcast) or may be addressed to particular terminals that requested the information via an interactive menu (referred to herein as "demand-cast"). An interactive menu structure suitable for requesting video-on-demand (VOD) is disclosed in commonly assigned U.S. Pat. No. 6,208,335, entitled "METHOD AND APPARATUS FOR PROVIDING A MENU STRUCTURE FOR AN INTERACTIVE INFORMATION DISTRIBUTION SYSTEM," patented Mar. 27, 2001, and incorporated herein by reference. Another example of an interactive menu suitable for requesting multimedia services is an interactive program guide disclosed in commonly assigned U.S. Pat. No. 6,754,905, entitled "DATA STRUCTURE AND METHODS FOR PROVIDING AN INTERACTIVE PROGRAM GUIDE," patented Jun. 22, 2004, and incorporated herein by reference.

Figure 2A:
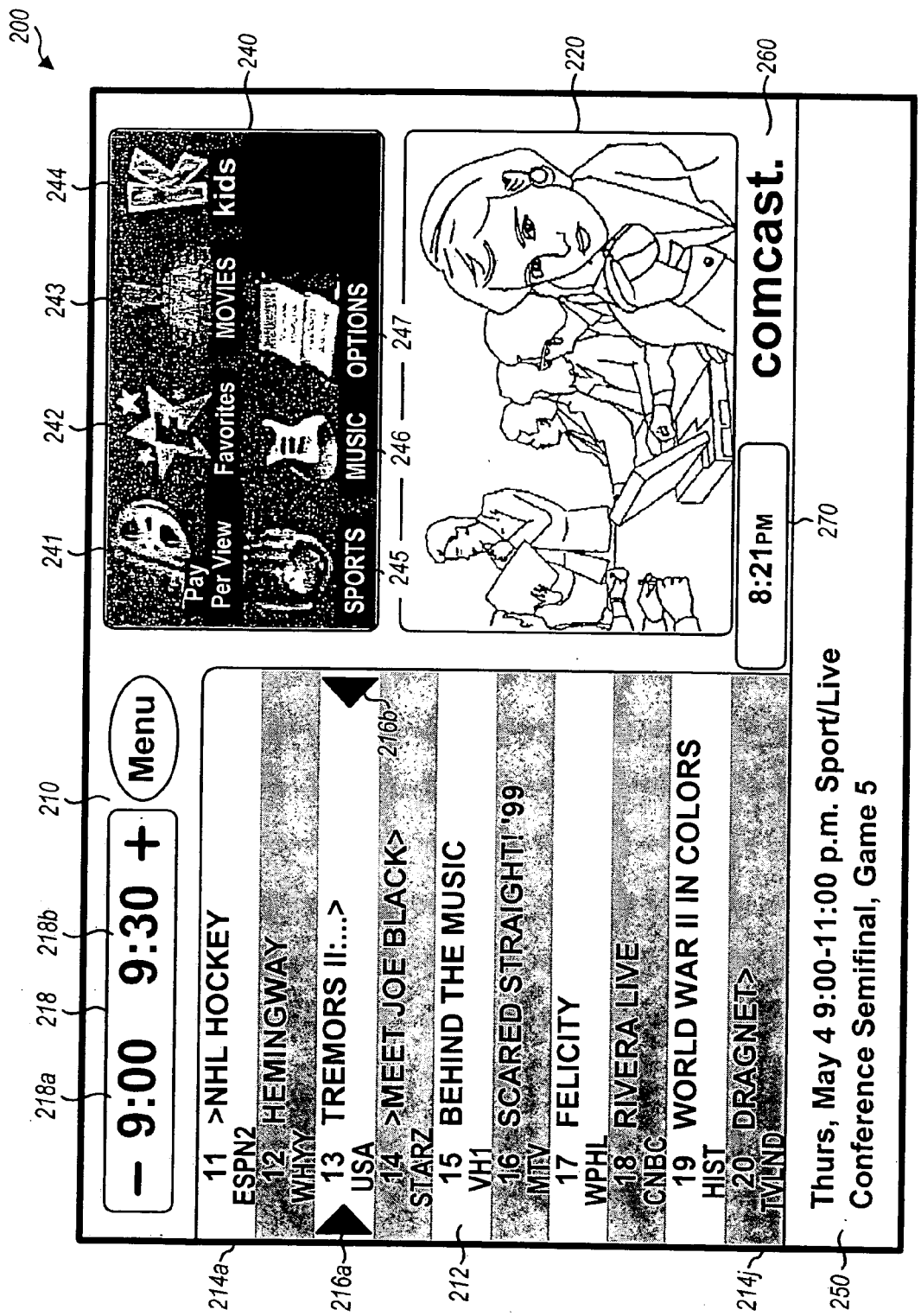
FIG. 2A is a diagram of a specific design of an IPG page used to present a program listing and other information to viewers.

To assist a viewer to select programming, head-end 102 produces information that can be assembled to create an "IPG page" such as that shown in FIG. 2A. Head-end 102 produces the components of the IPG page as bitstreams that are compressed prior to transmission. Terminals 108 thereafter receive and demodulate the transmission from head-end 102 and decode the compressed bitsteams to retrieve the IPG pages.

Within distribution system 100, a video source 112 supplies one or more video sequences for a video portion of the IPG pages (also referred to herein as "barker" videos), an audio source 114 supplies one or more audio signals associated with the video sequences, and a guide data source 116 provides program guide data for a guide portion of the IPG pages. The guide data is typically stored and provided in a particular (e.g., text) format, with each guide entry describing a particular program by its title, presentation time, presentation date, descriptive information, channel, and program source. The video sequences, audio signals, and program guide data are provided to an encoder unit 120 within head-end 102.

Encoder unit 120 (which is described in further detail below) compresses the received video sequences into one or more elementary streams, the audio signals into one or more elementary streams, and the guide videos produced from the guide data into one or more elementary streams. The elementary streams can be produced using a number of encoding techniques such as, for example, "picture-based" encoding, "slice-based" encoding, "temporal slice persistence" (TSP) encoding, "strobecast", as well as other types of encoding, or a combination thereof.

Picture-based encoding is described in detail in U.S. Pat. No. 6,621,870, entitled "METHOD AND APPARATUS FOR COMPRESSING VIDEO SEQUENCES," patented Sep. 16, 2003. Slice-based encoding is described in detail in U.S. Pat. No. 6,651,252, entitled "METHOD AND APPARATUS FOR TRANSMITTING VIDEO AND GRAPHICS IN COMPRESSED FORM," patented Nov. 18, 2003. Temporal slice persistence encoding is described in detail in U.S. Pat. No. 6,754,271, entitled "TEMPORAL SLICE PERSISTENCE METHOD AND APPARATUS FOR DELIVERY OF INTERACTIVE PROGRAM GUIDE," patented Jun. 22, 2004. Strobecast encoding and delivery is described in detail in U.S. patent application Ser. No. 09/687,662, entitled "EFFICIENT DELIVERY OF INTERACTIVE PROGRAM GUIDE USING DEMAND-CAST," filed Oct. 12, 2000. These applications are assigned to the assignee of the invention and incorporated herein by reference.

In the specific embodiment shown in FIG. 1, encoder unit 120 includes a guide data grid generator 122, a compositor unit 124, video encoders 126a and 126b, and an audio encoder 128. Additional video and/or audio encoders may also be included within encoder unit 120, depending on the particular head-end design. Guide data grid generator 122 receives and formats the guide data into a "guide grid", e.g., guide grid region 212 in FIG. 2A.

Figure 2B:
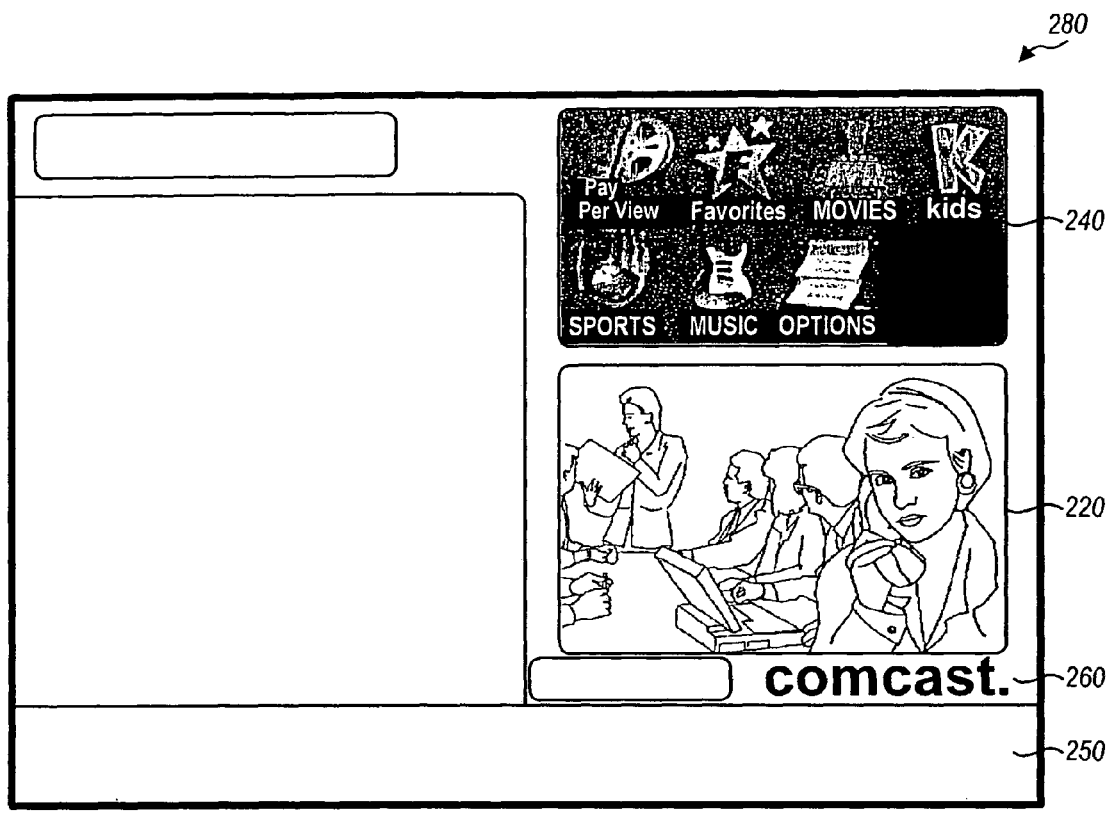
FIGS. 2B and 2C are diagrams of an embodiment of a background video and a guide video, respectively, for the IPG page shown in FIG. 2A.
Figure 2C:
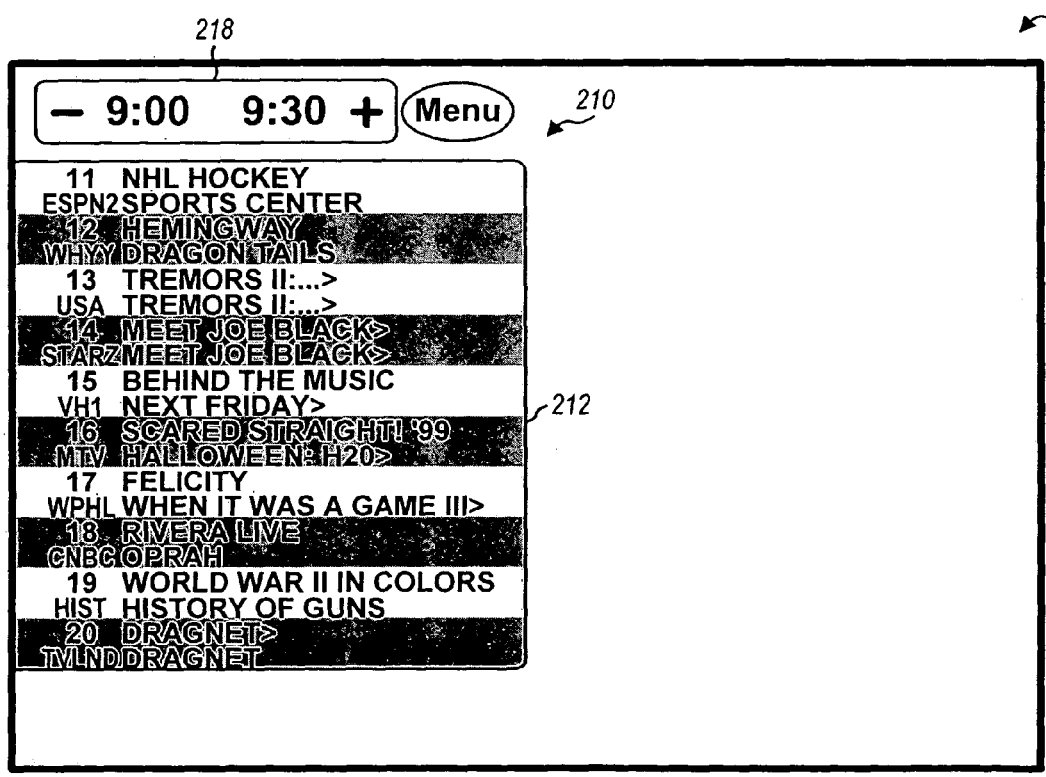

Compositor unit 124 receives and combines the guide grid from grid generator 122 and a video sequence from video source 112, and may further insert advertising video, advertiser or service provider logos, still graphics, animation, other information, or a combination thereof. In an embodiment, compositor unit 124 provides a background video (e.g., as shown in FIG. 2B) to a first video encoder 126a and a guide video (e.g., as shown in FIG. 2C) to a second video encoder 126b. For picture-based encoding, compositor unit 124 provides a composed video (e.g., as shown in FIG. 2A) to one video encoder. A number of encoders can be used to encode in parallel a number of composed videos for a number of IPG pages, with each IPG page including different guide content.

In an embodiment, video encoder 126a is a real-time (e.g., MPEG-2) encoder that encodes the background video using a particular encoding technique, and provides one or more (e.g., MPEG-2 compliant) bitstreams for the background portion of the IPG page. In an embodiment, video encoder 126b is a (e.g., software-based) encoder that encodes the guide video using a particular encoding technique, and provides one or more bitstreams that collectively represent all or a portion of the guide grid. Each video encoder 126 is designed to efficiently and effectively encode the respective input video, and may be operated in accordance with slice-based, picture-based, temporal slice persistence, or some other encoding technique. Audio encoder 128 (e.g., an AC-3 encoder) receives and encodes the audio signals to form a bitstream for the audio signals. The video and audio encoders provide a number of elementary streams containing (e.g., picture-based or slice-based) encoded video and audio information.

For some applications such as picture-in-picture (PIP) or picture-in-application (PIA), compositor unit 124 may receive a number of video sequences and form a composed video having included therein the video sequences in scaled form (i.e., reduced in size). For example, nine video sequences may be compressed and arranged into a 3×3 grid. Video encoder 126a then receives and (e.g., slice-based) encodes the composed video and produces a number of elementary streams, one stream for each video sequence. Each video sequence can thereafter be individually transmitted from the head-end and flexibly recombined with other (e.g., guide) data and/or video at the terminal (e.g., to implement PIP or PIA). PIP and PIA are described in further detail in U.S. patent application Ser. No. 09/635,508, entitled "METHOD AND APPARATUS FOR TRANSITIONING BETWEEN INTERACTIVE PROGRAM GUIDE (IPG) PAGES," filed Aug. 9, 2000, assigned to the assignee of the invention and incorporated herein by reference.

A controller 130 couples to encoder unit 120 and manages the overall encoding process such that the video encoding process is temporally and spatially synchronized with the grid encoding process. For slice-based encoding, this synchronization can be achieved by defining the slice start and stop (macroblock) locations for each slice and managing the encoding process based on the defined slices. Slices may be defined, for example, according to the objects in the IPG page layout.

The encoding process generates a group of pictures (GOP) structure having "intra-coded" (I) pictures and "predicted" (P and B) pictures. For slice-based encoding, the I pictures include intra-coded slices and the P and B pictures include predictive-coded slices. In an embodiment, the intra-coded slices are separated from the predictive-coded slices and transmitted from the head-end via separate packet identifiers (PIDs). Although not shown in FIG. 1, the coded slices may be stored in a storage unit. The individual slices can thereafter be retrieved from the storage unit as required for transmission from the head-end.

A transport stream generator (TSG) 140 receives and assembles the elementary streams from the video and audio encoders into one or more transport streams. Transport stream generator 140 further manages each transport stream and communicates with a session manager 150 to form and/or tear down transport streams. In an embodiment, each transport stream is an MPEG-compliant transport stream. In this case, transport stream generator 140 may send program tables to terminals 108 in a private section of the MPEG transport stream. Such table may include a list of available streams along with the address of the source transport stream generator and other information to identify the particular transport stream to which the table belongs.

Session manager 150 manages the delivery of IPG pages to terminals 108 located on one or more distribution nodes 106. In an embodiment, each distribution node 106 is served by a respective set of one or more transport streams generated by a transport stream generator assigned to that node. The transport streams for each distribution node include broadcast streams (e.g., for IPG pages continually sent from the head-end) and demand-cast streams (e.g., for IPG pages sent from the head-end in response to requests from the terminals). For some implementations, session manager 150 may monitor the demand-cast streams and usage by terminals 108 and direct the appropriate transport stream generator to generate or tear down demand-cast streams.

An in-band delivery system 160 (e.g., a cable modem) receives and modulates the transport streams from transport stream generator 140 using a modulation format suitable for transmission over communication channel 162, which may be, for example, a fiber optic channel that carries high-speed data from the head-end to a number of LNE and/or distribution nodes. Each LNE selects the programming (e.g., the IPG page components) that is applicable to its neighborhood and re-modulates the selected data into a format suitable for transmission over the associated distribution node(s).

Although not shown in FIG. 1 for simplicity, LNE 104 may include a cable modem, a slice combiner, a multiplexer, and a modulator. The cable modem demodulates a signal received from the head-end and extracts the coded video, guide, data, and audio information from the received signal. The coded information is typically included in one or more transport streams. The slice combiner may recombine the received video slices with the guide slices in an order such that a decoder at the terminals can easily decode the IPG without further slice re-organization. The multiplexer assigns PIDs for the resultant combined slices and forms one or more (e.g., MPEG-compliant) transport streams. The modulator then transmits the transport stream(s) to the distribution node(s).

LNE 104 can be programmed to extract specific information from the signal transmitted by the head-end. As such, the LNE can extract video and guide slices that are targeted to the viewers served by the LNE. For example, the LNE can extract specific channels for representation in the guide grid that can be made available to the viewers served by that LNE. In such case, unavailable channels to a particular neighborhood would not be depicted in a viewer's IPG. The IPG may also include targeted advertising, e-commerce, program notes, and others. To support such features, each LNE may recombine different guide slices with different video slices to produce IPG pages that are prepared specifically for the viewers served by that particular LNE. Other LNEs may select different IPG component information that is relevant for their associated viewers. A detailed description of LNE 104 is described in the aforementioned U.S. patent application Ser. No. 09/635,508.

For a server-centric distribution system, the program guide resides at the head-end and a two-way communication system, via a back channel 164, is utilized to support communication with the terminals for delivery of the program guide. Back-channel 164 can be used by the terminals to send requests and other messages to the head-end, and may also be used by the head-end to send messages and certain types of data to the terminals. An out-of-band delivery system 170 facilitates the exchange of data over the back channel and forwards terminal requests to session manager 150.

Other elements within head-end 102 may also interface with out-of-band delivery system 170 to send information to terminal 108 via the out-of-band network. Fort example, a spotlight server that produces a spotlight user interface (described below) may interface with out-of-band delivery system 170 directly to send spotlight data to terminals 108. Off the shelf equipment including network controllers, modulators, and demodulators such as those provided by General Instrument Corporation can be used to implement out-of-band delivery system 170.

Distribution system 100 is described in further detail in the aforementioned U.S. patent application Ser. No. 09/687,662 and U.S. Pat. No. 6,754,271. One specific implementation of head-end 102 is known as the DIVA™ System provided by DIVA Systems Corporation.

B. Interactive Program Guide

A unique way of providing programming schedule and listing to viewers is a server-centric approach. In this approach, the complete program guide information spanning a particular time period (e.g., two weeks of programming) is generated at a head-end and sent to the terminals in a display-ready compressed video format.

FIG. 2A is a diagram of a specific design of an IPG page 200 used to present a program listing and other information to viewers. In this design, IPG page 200 includes a guide region 210, a video region 220, an icon region 240, a program description region 250, a logo region 260, and a time-of-day region 270. Other designs for the IPG page with different layouts, configurations, and combinations and arrangements of regions and objects can be contemplated and are within the scope of the invention.

In an embodiment, guide region 210 includes a guide grid region 212 and a time slot region 218. Time slot region 218 includes a first time slot object 218a and a second time slot object 218b that indicate the (e.g., half-hour) time slots for which program guide is being provided on the IPG page. Guide grid region 212 is used to display program listing for a group of channels. In the design shown in FIG. 2A, the program listing shows the available programming in two half-hour time slots. Guide grid region 212 includes a number of channel objects 214a through 214j used to display program information for the group of channels. A pair of channel indicators 216a and 216b within guide grid region 212 identifies the current cursor location.

Program description region 250 is used to present descriptive information relating to a particular program selected from the program listing, or may be used to present other information. Video region 220 may be used to display images, videos, text, or a combination thereof, which may be used for advertisements, previews, or other purposes. In the design shown in FIG. 2A, video region 220 displays a barker video. Logo region 260 may include a logo of a service operator or other entity, and may be optionally displayed. Time-of-day region 270 may be configured by the user and may also be optionally displayed.

Icon region 240 is used to display various icons. Each icon can represent a filter or a link to either another IPG page or a particular interface. Each filter selects a particular type of programming to be included in the program listing shown in guide region 210. For example, a "Pay Per View" (PPV) icon 241 may be a filter that selects only PPV programming to be included in the program listing. A "Favorites" icon 242 may be a filter that selects only channels designated by the viewer to be among his or her favorites. A "Movies" icon 243 may be a filter that selects only movies or movie channels. A "Kids" icon 244 may be a filter that selects only channels for children or programming appropriate or produced for viewing by children. A "Sports" icon 245 may be a filter that selects only sports channels or sports-related programming. A "Music" icon 246 may be a link to a music interface. And an "Options" icon 247 may be a link to a menu of IPG options that the viewer may select amongst. Such options may include (1) configuration and selection/deselection information of IPG related services, (2) custom information for deactivating some of the filters or accessing a custom condensed listing menus, and (3) other features and functionality.

FIG. 2B is a diagram of an embodiment of a background video 280 for IPG page 200. In this embodiment, background video 280 includes video region 220, icon region 240, program description region 250, and logo region 260. As noted above, background video 280 can be efficiently (slice-based) encoded by a video encoder. In other designs, background video 280 may include additional and/or different regions than that shown in FIG. 2B.

FIG. 2C is a diagram of an embodiment of a guide video 290 for IPG page 200. In this embodiment, guide video 290 includes guide region 210, which includes guide grid region 212 and time slot region 218. Guide video 290 can also be efficiently (slice-based) encoded by a video encoder. In other designs, guide video 290 may include additional and/or different regions than that shown in FIG. 2C.

As shown in FIG. 2C, two program titles are provided for each channel object 214 in guide grid region 212, with each title corresponding to a respective half-hour time slot. In an embodiment, a "mask or reveal" feature can be used to display (i.e., reveal) a desired program title and hide (i.e., mask) the other program title. For example, channel 12 includes the program titles "Hemingway" and "Dragon Tails". If the 9:00-9:30 time slot is selected (as shown in FIG. 2A), the program title "Hemingway" can be revealed and the other program title "Dragon Tails" can be masked from view. And if the 9:30-10:00 time slot is selected, the program title "Hemingway" can be masked and the other program title "Dragon Tails" can be revealed. The underlying video frame to be encoded can thus include various objects and items, some of which may be shown and others of which may be hidden. This mask or reveal technique can be used for any region of the IPG page.

The mask or reveal feature and the user interaction processing are described in the aforementioned U.S. Pat. Nos. 6,754,905 and 6,208,335.

A program guide for a large number of channels for a long time period can be very extensive. For example, 480 IPG pages would be needed to provide program guide for two weeks of programming for 200 channels, if each IPG page includes a program listing for 10 channels in two half-hour time slots as shown in FIG. 2A. A large amount of system resources (e.g., bandwidth) would be needed to continually transmit the complete program guide.

In an embodiment, to conserve system resources, only a limited number of IPG pages are continually sent (broadcast) by the head-end, and remaining IPG pages may be sent as requested by viewers. The specific number of IPG pages to be broadcasted and their selection are dependent on the particular system implementation, and may be defined by a time depth and a program depth for the program guide. The time depth refers to the amount of time programming for a particular channel group is provided by the broadcast video PIDs. And the channel depth refers to the number of channels available through the program guide (in comparison to the total number of channels available in the system).

In an embodiment, a number of video PIDs can be used to send the program guide for the current and (possibly) near look-ahead time slots, one or more audio PIDs can be used to send an audio barker, and (optionally) one or more data PIDs (or other data transport method) can be used to send the program description data, overlay data, and/or other data. The elementary streams carrying the IPG are sent in one or more transport streams.

For the portion of the program guide that is broadcasted by the head-end, a viewer is able to quickly retrieve and display IPG pages formed from the broadcast streams whenever desired.

If the viewer desires a program listing or other contents that is not provided by the broadcast streams, then a demand-cast session may be initiated, for example, as described in the aforementioned U.S. patent application Ser. No. 09/687,662 and U.S. Pat. No. 6,208,335. For this demand-cast session, the terminal sends a message to the head-end, via the back channel, requesting the desired contents. The head-end processes the request, retrieves the desired contents from an appropriate source, generates a video stream for the desired contents and assigns it with another video PID (and related audio and data PIDs, if any), and incorporates the video stream into a transport stream. Preferably, the desired video stream is inserted into the transport stream currently being tuned/selected by the requesting terminal or sent in another transport stream. The head-end further informs the terminal which PID should be received and from which transport stream the demand-cast video stream should be demultiplexed. The terminal then retrieves the desired video stream from the transport stream.

C. Data Structures and Encoding Techniques

Figure 3A:
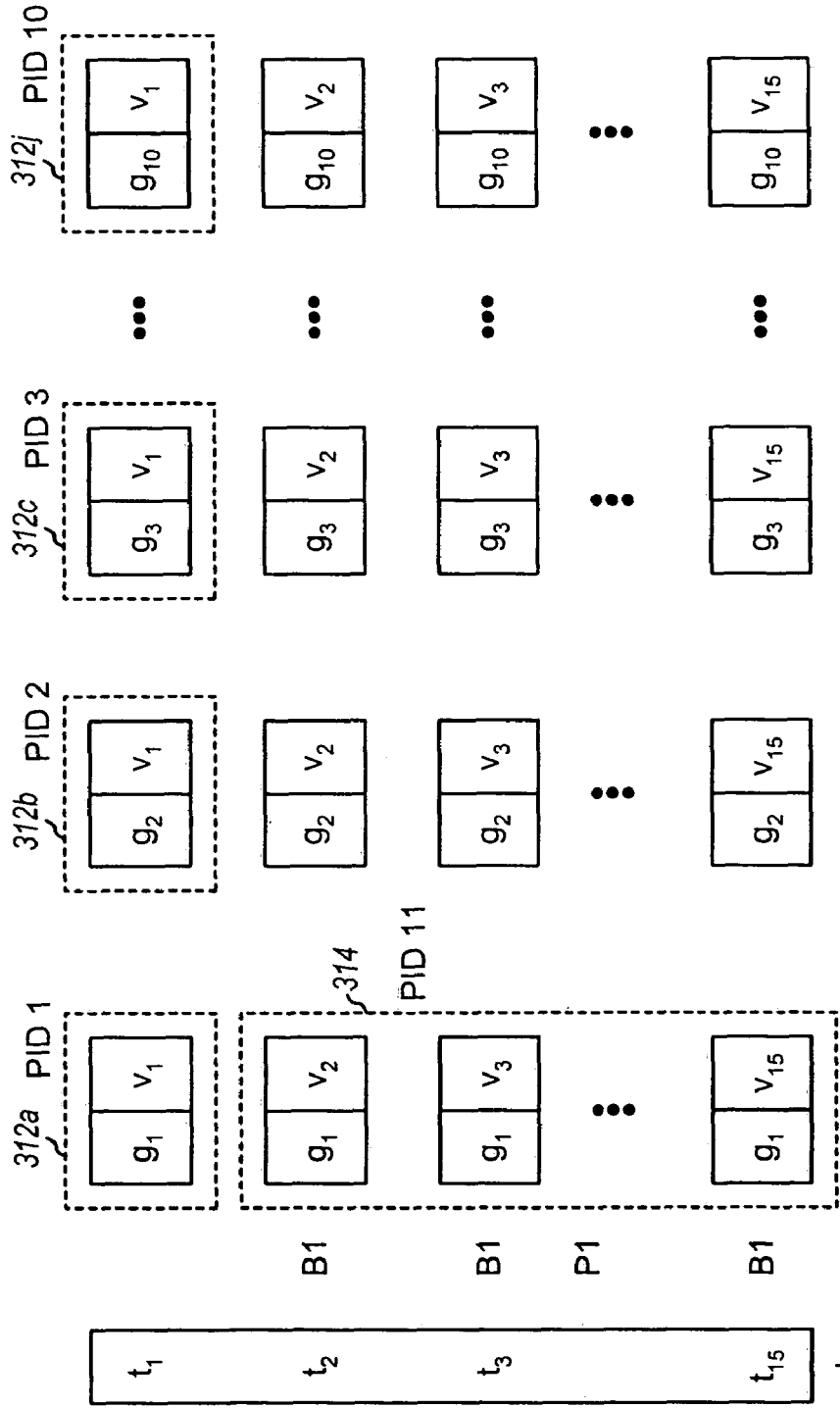
FIGS. 3A through 3C are diagrams of data structures (i.e., matrices) of program guide data for a group of IPG pages, and which may be used in conjunction with picture-based encoding, slice-based encoding, and temporal slice persistence encoding, respectively.

FIG. 3A is a diagram of a data structure 300 (i.e., a matrix) of program guide data for a group of IPG pages, and which may be used in conjunction with picture-based encoding. In this representation, the horizontal axis represents the video sequences for different IPG pages to be transmitted, and the vertical axis represents time indices for the video sequences. In this specific example, ten video sequences are generated and labeled as IPG pages 1 through 10. Each video sequence is composed of a time sequence of pictures. In this specific example, each group of 15 pictures for each video sequence forms a group of pictures (GOP) for that video sequence. Matrix 300 is illustratively shown to include ten GOPs for ten IPG pages, but can be designed to have any defined M×N dimension.

As shown in FIG. 3A, matrix 300 is a two-dimensional array of elements, with each element representing a picture (or frame). For simplicity, each element in matrix 300 is illustratively shown to include a guide portion and a video portion on the left and right halves of the picture, respectively. The element in the first column of the first row represents the guide portion ($g_1$) and video portion ($v_1$) of IPG page 1 at time index $t_1$, the element in the second column of the first row represents the guide portion ($g_2$) and video portion ($v_1$) of IPG page 2 at time index $t_1$, and so on. In the specific example shown FIG. 3A, the guide portion for each IPG page is different (i.e., $g_1, g_2, \ldots, g_{10}$) but the video portion (e.g., $v_1$) is common for all ten IPG pages.

Each of the ten video sequences in matrix 300 can be coded as a GOP. For example, the video sequence for IPG page 1 can be coded as a GOP comprised of the coded picture sequence: I1, B1, B1, P1, B1, B1, P1, B1, B1, P1, B1, B1, P1, B1, and B1, where I represents an intra-coded picture, P represents a uni-directionally predictive-coded picture, and B represents a bi-directionally predictive-coded picture.

In the example shown in FIG. 3A, matrix 300 includes a group of intra-coded pictures 312 and a group of predictive-coded pictures 314 that can be used to fully represent the ten IPG pages. In an embodiment, intra-coded picture group 312 includes ten intra-coded pictures at time index $t_1$ for the ten IPG pages. These intra-coded pictures can be assigned to PIDs 1 through 10, which may also be referred to as I-PIDs 1 through 10 to denote that these PIDs include intra-coded pictures. In an embodiment, predictive-coded picture group 314 includes 14 predictive-coded pictures of one of the IPG pages for time indices $t_2$ through $t_{15}$. Predictive-coded picture group 314 is also assigned a PID, and may also be referred to as the base-PID or PRED-PID to denote that this PID includes predictive-coded pictures. The base-PID may comprise the following picture sequence: B1, B1, P1, B1, B1, P1, B1, B1, P1, B1, B1, P1, B1, and B1.

For each IPG page, between time $t_1$ to $t_{15}$, the guide portion does not change and only the video portion changes. In each column, the 14 prediction error frames contain zero data for the guide portion and video prediction error for the video portion. Therefore, the contents of the base-PID is the same for each IPG page and may be sent only once per group of IPG pages in the matrix for each GOP period.

If a viewer wants to view the guide data for a particular group of channels (i.e., a particular IPG page), a demultiplexer at the terminal selects the I-PID for the selected IPG page and recombines the selected I-PID with the base-PID to produce a recombined stream, which is then decoded by the video decoder. Picture-level recombination is described in further detail in the aforementioned U.S. Pat. No. 6,754,271.

Figure 3B:
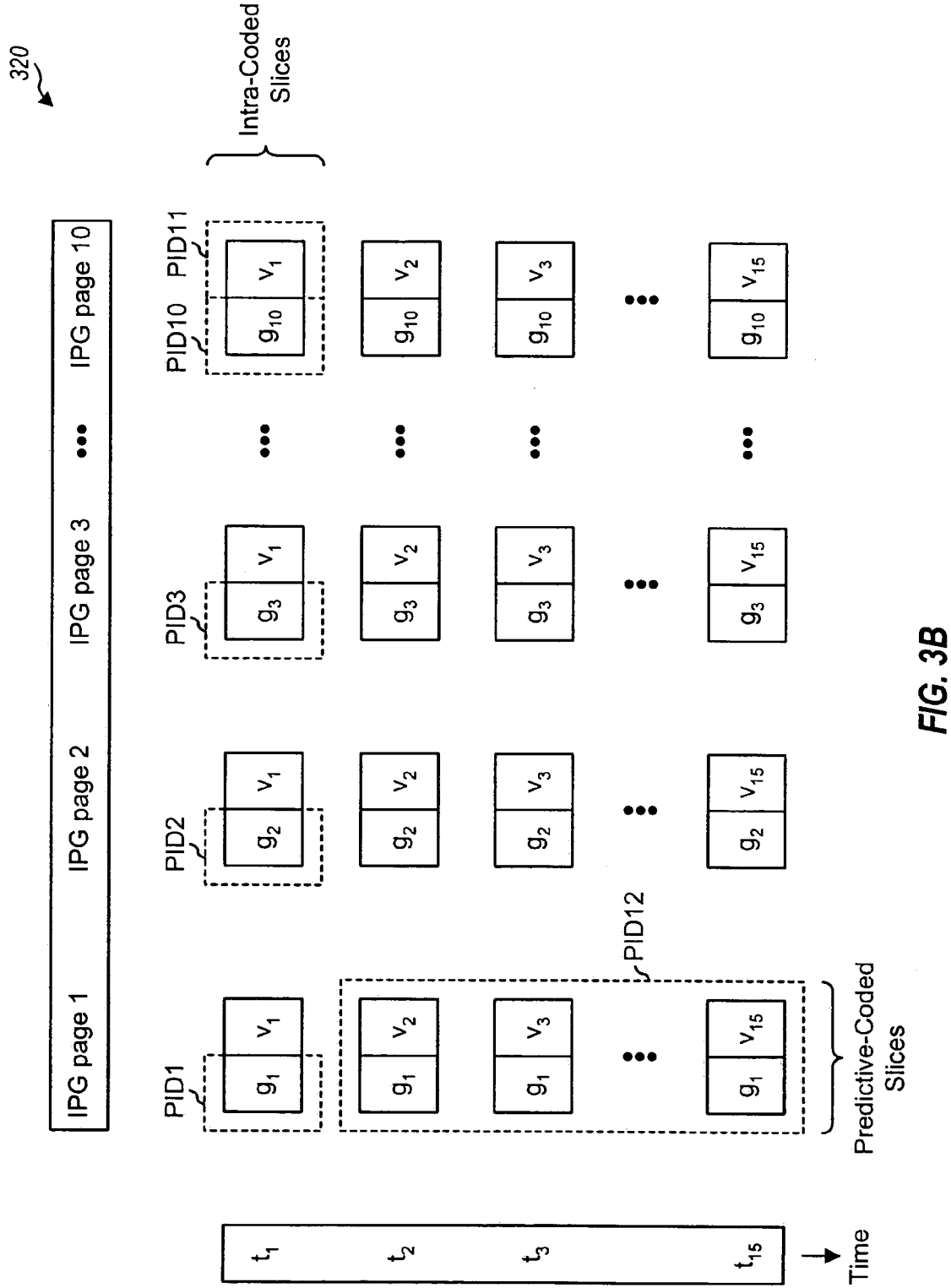

FIG. 3B depicts an embodiment of a data structure 320 that may be used in conjunction with slice-based encoding. In this example, ten IPG pages are available, with each page represented by a respective guide portion (g) and a common video portion (v). For example, IPG page 1 is represented as ($g_1/v_1$), IPG page 2 is represented as ($g_2/v_1$), and so on. In data structure 320, ten guide portions $g_1$ through $g_{10}$ are associated with the video portion ($v_1$). Slice-based encoding is described in the aforementioned U.S. patent application Ser. No. 09/635,508 and U.S. Pat. No. 6,754,271.

As shown in FIG. 3B, the coded slices for the guide and video portions of the IPG pages can be assigned to a number of PIDs. In FIG. 3B, only the contents that is assigned a PID is delivered to the terminals. The intra-coded guide portions $g_1$ through $g_{10}$ are assigned to PID 1 through PID 10, respectively. One of the common intra-coded video portion $v_1$ (e.g., for IPG page 10) is assigned to PID 11. In this form, substantial bandwidth saving is achieved by delivering the intra-coded video portion $v_1$ only once. Finally, the predictive-coded pictures $g_1/v_2$ through $g_1/v_{15}$ are assigned to PID 12. Again, a substantial saving in bandwidth is achieved by transmitting only one group of fourteen predictive-coded pictures, $g_1/v_2$ through $g_1/v_{15}$. The PID assignment and decoding processes are described in the aforementioned U.S. Pat. No. 6,754,271.

Figure 3C:
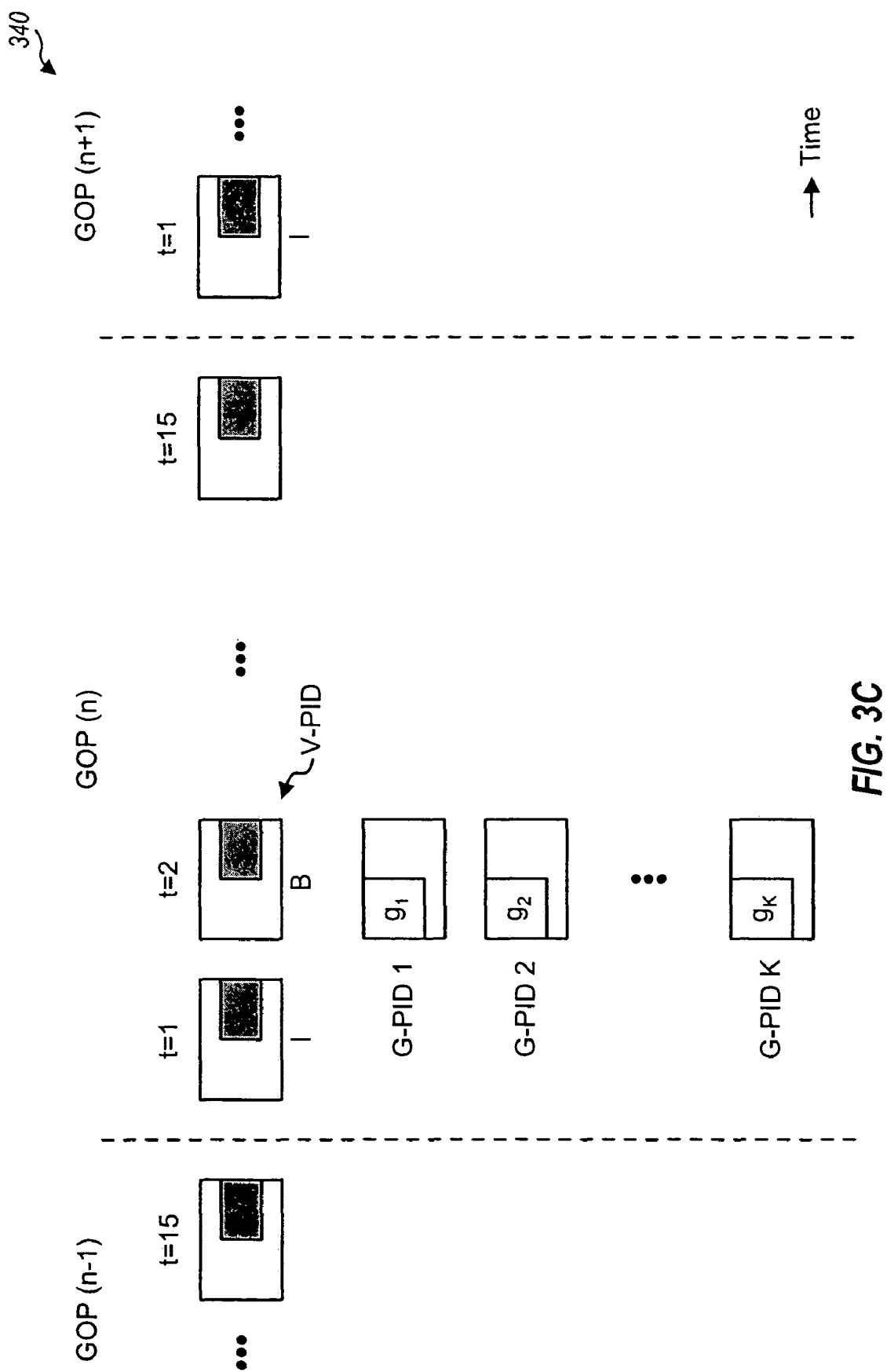

FIG. 3C is a diagram of a data structure 340 that can be used in conjunction with temporal slice persistence encoding. Data structure 340 is a matrix representation for program guide data for a number of IPG pages based on the partitioning of the IPG page shown in FIGS. 2B and 2C. As shown by the shaded portions in FIG. 3C, a video sequence is formed which contains only the video portion of the IPG page (i.e., the portion containing time-varying information). In an embodiment, the coded video sequence contains only slices that belong to the video region. The coded video sequence is assigned a particular PID (e.g., V-PID) and transmitted from the head-end.

For each IPG page, the guide portion (i.e., the portion containing the information specific to that IPG page) is sent in a separate picture frame. Since the guide portion does not change over time, only one picture for each GOP is coded and transmitted. The coded guide frame contains only the slices that belong to the guide portion of a frame. The slice-coded guide portion for each IPG page is assigned a respective PID (e.g., G-PID) and also transmitted from the head-end.

The presentation times of the guide frames and motion video frames are assigned in accordance with a "temporal slice persistence" fact. In an embodiment (not represented in FIG. 3C), the guide PIDs (i.e., G-PID 1, G-PID 2, and so on) are time stamped to be presented at the end of each GOP at t=15. At t=15, the last motion video frame in the GOP is dropped and the viewer-selected guide page is presented. To achieve this, the video decoder re-combines the selected guide G-PID (e.g., G-PID 1) and the video V-PID via one of the picture-based recombination methods described in the aforementioned U.S. Pat. No. 6,754,271.

The selected guide page is decoded and displayed at t=15, with only the region that contains the guide portion slices being updated on the screen. From that time on, the guide portion of the screen is not updated (i.e., the guide slices temporally persist on the screen) until the viewer selects another guide page. This selection then updates the slices in the guide portion and rewrites the new guide portion on the screen. Similarly, the V-PID frames only change the video portion of the screen and do not update the guide portion, since these motion video frames do not include slices in the guide portion.

The embodiments disclosed with respect to FIG. 3C can be used for broadcast of IPG pages and can further be used for a demand-cast of IPG pages in response to viewer requests. For demand-cast, the head-end can time stamp the requested page to be processed and quickly displayed on the screen in a suitable time index within a GOP to reduce delays. The guide frames and motion video frames can be encoded, delivered, decoded, and displayed in various manners, as described in the aforementioned U.S. Pat. No. 6,754,271.

In another embodiment that is supported by FIG. 3C, the V-PID is encoded to include P and B pictures (e.g., a GOP of I-B-B-P-B-B-P-B-B-P-B-B-P-B-B), and any B picture in the V-PID can be dropped and replaced with a B-coded guide frame that includes "intra-coded" macroblocks. This can be achieved by adjusting the encoding threshold selection that decides whether a macroblock is better to be encoded as intra-coded or as predictive-coded. Any B-coded frame can be dropped and replaced since it is not used as a reference for prediction by any other pictures in a GOP. The guide page frames can be time stamped to be presented, for example, at t=2. Other embodiments for encoding and decoding the guide frames are described in the aforementioned U.S. Pat. No. 6,754,271.

Figure 3D:
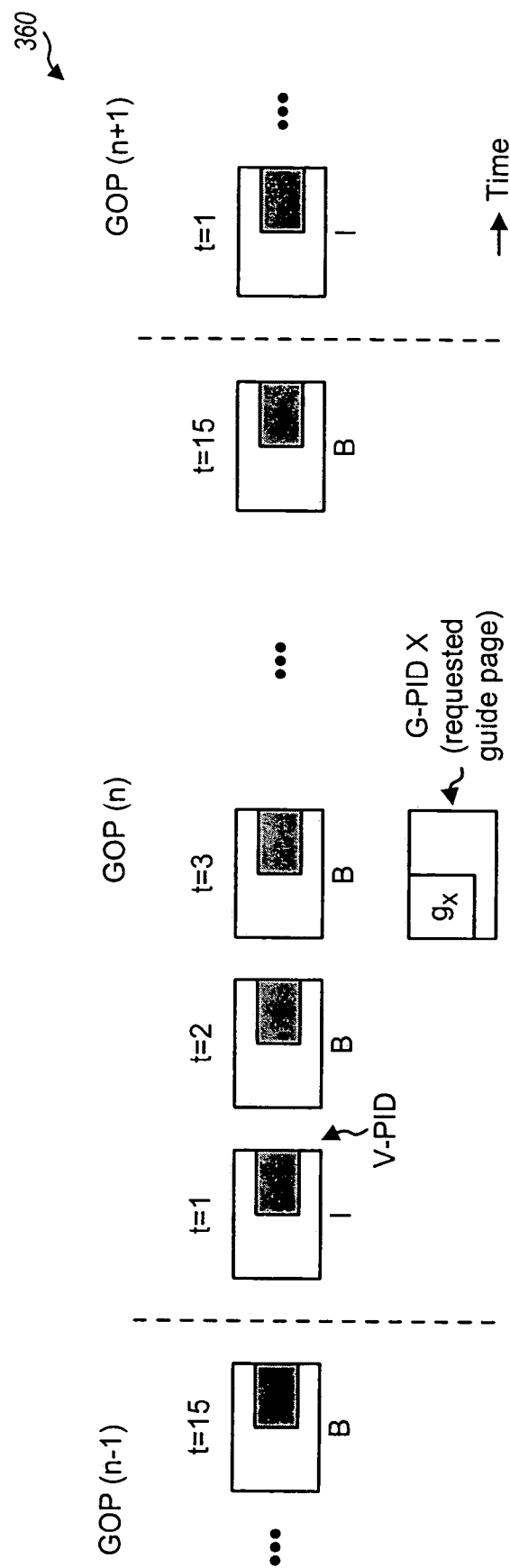
FIG. 3D is a diagram that shows an implementation of demand-cast with the use of temporal slice persistence technique.

FIG. 3D is a diagram that shows an implementation of demand-cast with the use of temporal slice persistence technique. In the example shown in FIG. 3D, a viewer request is received and processed by the head-end, and the requested guide PID is time stamped to be displayed at t=3. In this example, the V-PID is coded to include B frames (e.g., I-B-B-P-B-B-P . . . ), and the B frame at t=3 is dropped and replaced with a B-coded requested guide PID that includes intra-coded macroblocks. The B frame of the V-PID can be dropped at anytime in a GOP since it is not used as a reference for prediction by any other frame in the GOP.

The temporal slice persistence technique can be advantageously employed in a broadcast scenario whereby a large number of guide PIDs (in the order of hundreds) can be efficiently delivered. Since the guide PIDs do not carry full motion barker video, huge bandwidth savings can be achieved. The barker video can be sent as a separate video stream (e.g., V-PID or another PID). The temporal slice persistence technique can also be used to implement other combinations of coding and decoding of guide frames, full motion video frames, and (possibly) other multimedia information in a GOP. The temporal slice persistence technique employs picture-based recombination techniques with slice-based sub-picture updating mechanisms, as described in the aforementioned U.S. Pat. No. 6,754,271.

By exploiting known characteristics of the IPG pages and the temporal slice persistence technique, the transmission of redundant information can be minimized, for example, by employing efficient client-server communication and acknowledgement techniques. For example, the guide portion of a requested IPG page may be sent a limited number of times (e.g., once) in response to a viewer request for the page. This "strobecast" of IPG pages can greatly reduce the load for demand-cast, and may (possibly) be used for the delivery of other contents from the head-end. Strobecast techniques are described in detail in the aforementioned U.S. patent application Ser. No. 09/687,662.

D. Spotlight Window

Figure 4:
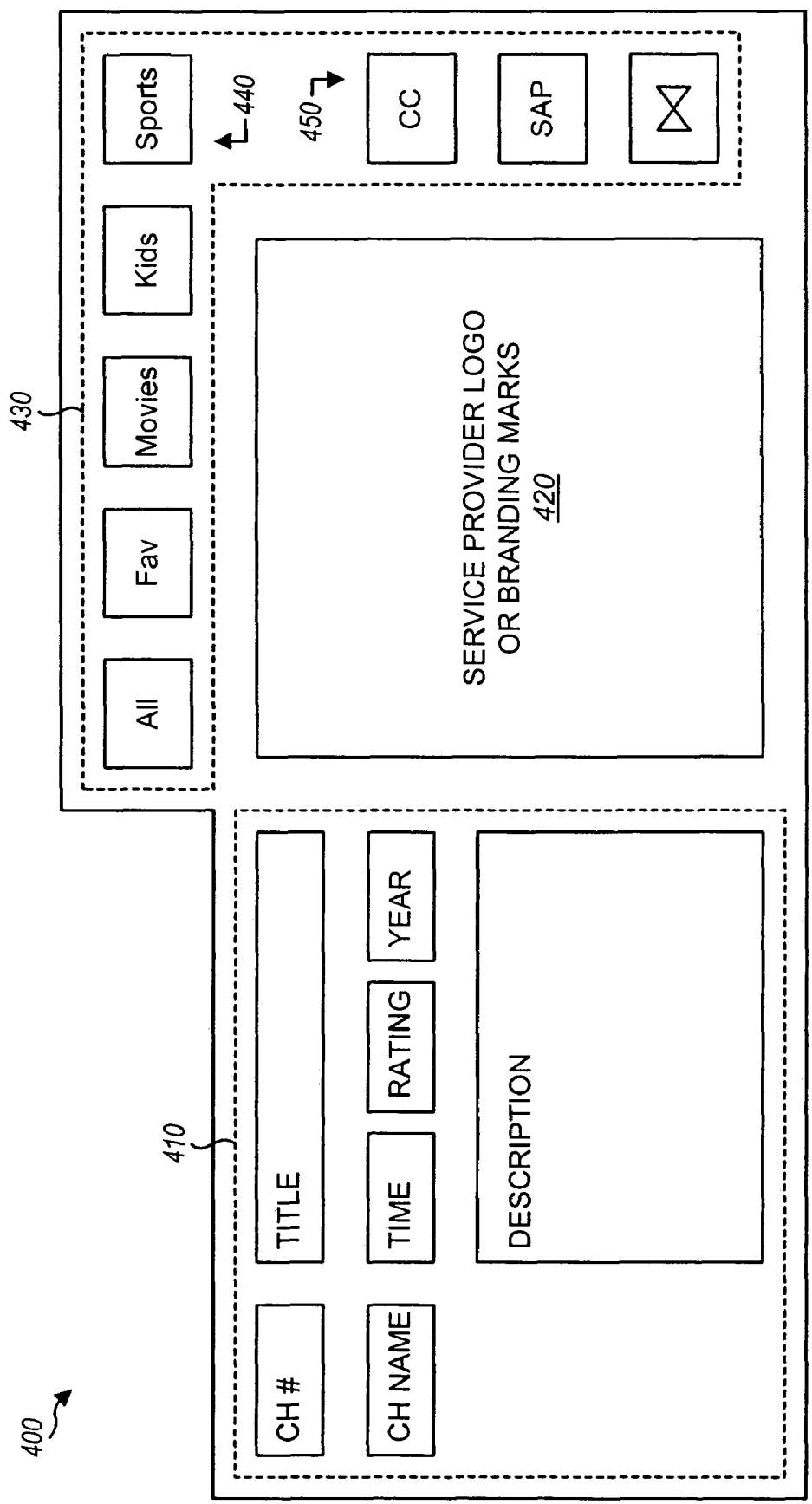
FIG. 4 is a diagram of a specific design of a channel information window (i.e., a spotlight window) that can also be used to efficiently provide IPG information.

FIG. 4 is a diagram of a specific design of a channel information window 400 (also referred to as a "spotlight window") that can also be used to efficiently provide IPG information. The spotlight window can be generated and overlay on top of a video display (e.g., whenever selected by a viewer). In this design, spotlight window 400 includes a specific portion 410, a local portion 420, and a common portion 430. Specific portion 410 includes information specific to a particular broadcast channel being described by spotlight window 400. Local portion 420 includes information targeted for delivery to the terminals within a particular locality. And common portion 430 includes features that are common for a number of spotlight windows (i.e., the background that is common for all broadcast channels and localities). FIG. 4 shows a specific design, and additional and/or different information, layouts, configurations, and arrangements may also be provided for each portion of spotlight window 400.

In the design shown in FIG. 4, specific portion 410 includes the channel number (e.g., "13"), the broadcast channel name (e.g., "USA"), the program title (e.g., "Tremors II: . . . "), the time period of the program (e.g., "9:00-11:00"), the program rating (e.g., "PG"), the copyright or release year (e.g., "1998"), and a brief description (e.g., "The creature from . . . ").

Local portion 420 includes, for example, a logo for the service provider or other branding related information. A different logo may be provided for each region served by a different service provider. Local portion 420 may also be partitioned into a number of smaller sub-portions, with each sub-portion being used to provide different information (e.g., targeted advertisements, locality specific announcements) and may further be associated with a particular localization level (e.g., an entire region, a neighborhood, or a set of terminals).

Common portion 430 includes a filter icon region 440 and an operational icon region 450. Filter icon region 440 includes a number of filter icons used to filter the programs to be displayed in the program guide, e.g., an "All" filter icon, a "Fav" or favorites filter icon, a "Movies" filter icon, a "Kids" filter icon, and a "Sports" filter icon. These filter icons can be designed to provide filtering functionality. Operational icon region 450 includes a close caption icon ("CC"), a secondary audio programming icon ("SAP"), and a stereo icon (""⋈"").

In an embodiment, all or portions of the spotlight window are generated at the head-end and sent to the terminals. In this manner, the head-end has control over the particular arrangement (i.e., the layout and configuration) for the spotlight window and the information to be included in the various fields and portions of the spotlight window. Bitmap for all or portions the spotlight window may be encoded at the head-end, packetized, and sent to the terminals (e.g., via an out-of-band network). The spotlight data can be processed by a separate spotlight server that does not interfere with the operations of the session manager or the transport stream processor to send the spotlight data via the out-of-band network.

Techniques for generating, encoding, and delivering spotlight window is described in U.S. patent application Ser. No. 09/691,495, entitled "SYSTEM AND METHOD FOR LOCALIZED CHANNEL INFORMATION WINDOW," filed Oct. 18, 2000, assigned to the assignee of the invention and incorporated herein by reference.

E. Terminal

Figure 5:
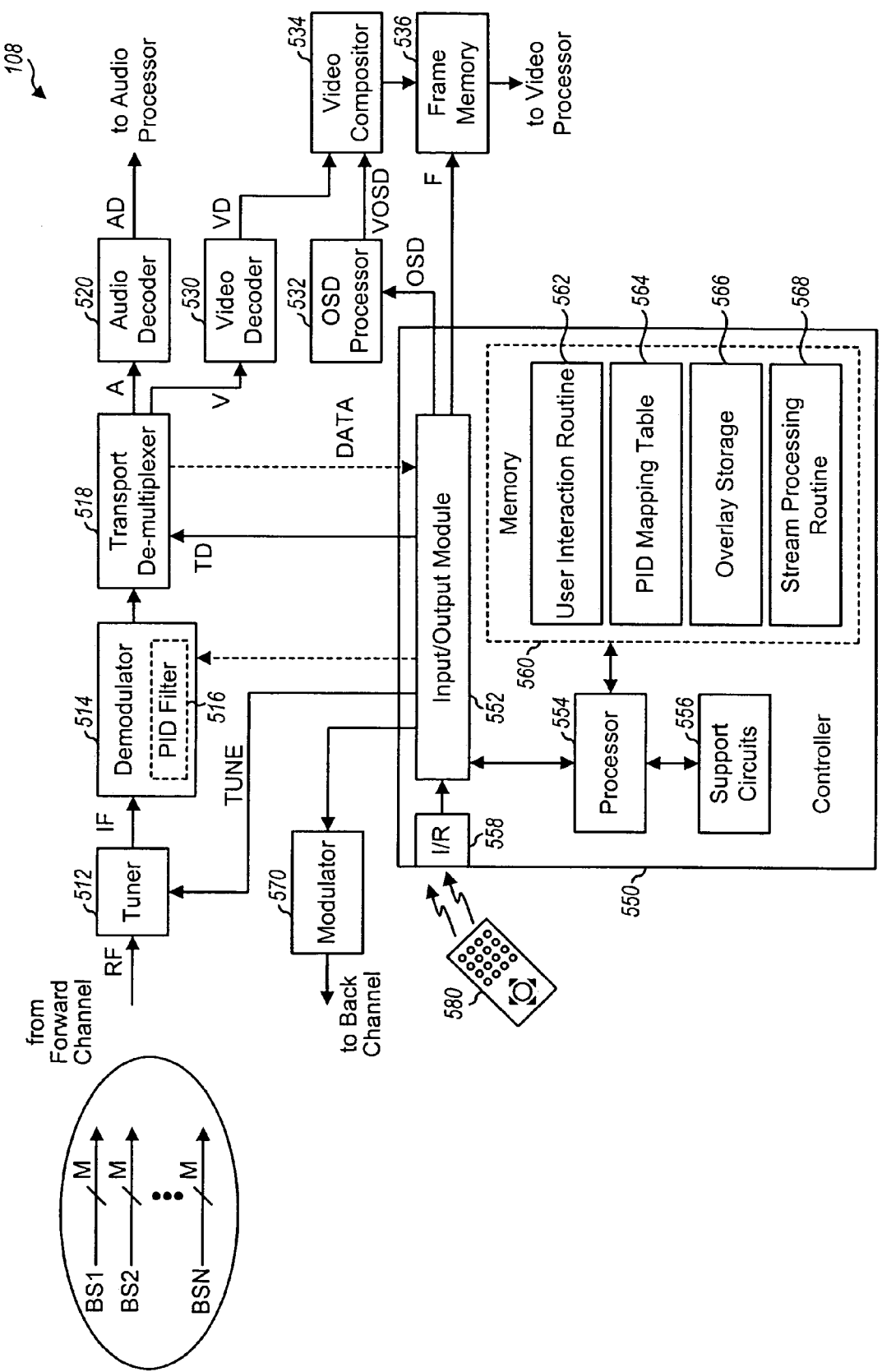
FIG. 5 is a block diagram of an embodiment of terminal capable of providing a display of a user interface and implementing various aspects of the invention.

FIG. 5 is a block diagram of an embodiment of terminal 108, which is also referred to as a set top terminal (STT) or user terminal. Terminal 108 is capable of producing a display of a user interface and implementing various aspects of the invention. Terminal 108 includes a tuner 512, a demodulator 514, a transport demultiplexer (DEMUX) 518, an audio decoder 520, a video decoder 530, an on-screen display (OSD) processor 532, a video compositor 534, a frame store memory 536, a controller 550, and a modulator 570. User interaction is supported via a remote control unit 580. Tuner 512 receives a radio frequency (RF) signal comprising, for example, a number of quadrature amplitude modulated (QAM) signals from a downstream (forward) channel. In response to a control signal TUNE, tuner 512 tunes to and processes a particular QAM signal to provide an intermediate frequency (IF) signal. Demodulator 514 receives and demodulates the IF signal to provide an information stream (e.g., an MPEG transport stream) that is sent to transport stream demultiplexer 518.

Transport stream demultiplexer 518, in response to a control signal TD produced by controller 550, demultiplexes (i.e., extracts) an audio stream A and a video stream V. The audio stream A is provided to audio decoder 520, which decodes the audio stream and provides a decoded audio stream to an audio processor (not shown) for subsequent processing and presentation. The video stream V is provided to video decoder 530, which decodes the compressed video stream V and provides an uncompressed video stream VD to video compositor 534. OSD processor 532, in response to a control signal OSD produced by controller 550, produces a graphical overlay signal VOSD that is provided to video compositor 534.

Video compositor 534 merges the graphical overlay signal VOSD and the uncompressed video stream VD to produce a composed video stream (i.e., the underlying video images with the graphical overlay). Frame store unit 536 receives and stores the composed video stream on a frame-by-frame basis according to the frame rate of the video stream. Frame store unit 536 thereafter provides the stored video frames to a video processor (not shown) for subsequent processing and presentation on a display device. In an embodiment, during transitions between streams for a user interface, the buffers in the terminal are not reset, and the user interface seamlessly transitions from one screen to another.

Controller 550 includes an input/output (I/O) module 552, a processor 554, support circuitry 556, an infrared receiver (I/R) 558, and a memory 560. Input/output module 552 provides an interface between controller 550 and tuner 512, demodulator 514 (for some designs), transport demultiplexer 518, OSD processor 532, frame store unit 536, modulator 570, and a remote control unit 580 via infrared receiver 558.

Processor 554 interfaces with I/O module 552, support circuitry 556 (which may include power supplies, clock circuits, cache memory, and the like), and a memory 560. Processor 554 also coordinates the execution of software routines stored in memory 560 to implement the features and perform the functions supported by the terminal.

Memory 560 stores software routines that support various functions and features, and further stores data that may be used for the user interface. In the embodiment shown in FIG. 5, memory 560 includes a user interaction routine 562, a PID mapping table 564, an overlay storage 566, and a stream processing routine 568. User interaction routine 562 processes user interactions to perform various functions to provide the desired user interface menu. For example, user interaction routine 562 can implement a mask or reveal feature to display (reveal) the desired portion of the IPG page and hide (mask) the undesired portion. User interaction routine 562 may further perform various functions to achieve a demand-cast for a desired IPG page. The mask or reveal is described in U.S. Pat. Nos. 6,754,905 and 6,208,335.

Stream processing routine 568 coordinates the recombination of video streams to form the desired video sequences. Stream processing routine 3468 employs a variety of methods to recombine slice-based streams, some of which are described in the aforementioned U.S. Pat. No. 6,754,271. In one recombination method, a PID filter 516 within demodulator 514 is utilized to filter the undesired PIDs and retrieve the desired PIDs from the transport stream. The packets to be extracted and decoded to form a particular IPG page are identified by PID mapping table 564. For most recombination methods, after stream processing routine 568 has processed the streams into the proper order, the slices are sent to video decoder 530 (e.g., an MPEG-2 decoder) to form uncompressed IPG pages suitable for display.

Although controller 550 is depicted as a general-purpose processor that may be programmed to perform specific control functions to implement various aspects of the invention, the controller may also be implemented in hardware as an application specific integrated circuit (ASIC).

In a specific design, remote control unit 580 includes an 8-position joystick, a numeric pad, a "Select" key, a "Freeze" key, and a "Return" key. User manipulations of the joystick or keys on the remote control device are transmitted to controller 550 via an infrared (IR) link or an RF link. Controller 550 is responsive to the user manipulations and executes the appropriate portion of user interaction routine 562 to process the user manipulations.

FIG. 5 shows a specific design of terminal 108. Other designs of the terminal can also be implemented to perform the functions described herein, and these alternative designs are within the scope of the invention.

F. IPG and VOD Interfaces

The invention provides interactive program guide (IPG) and video-on-demand (VOD) interfaces that support IPG and VOD services for a terminal.

1. System

Figure 6:
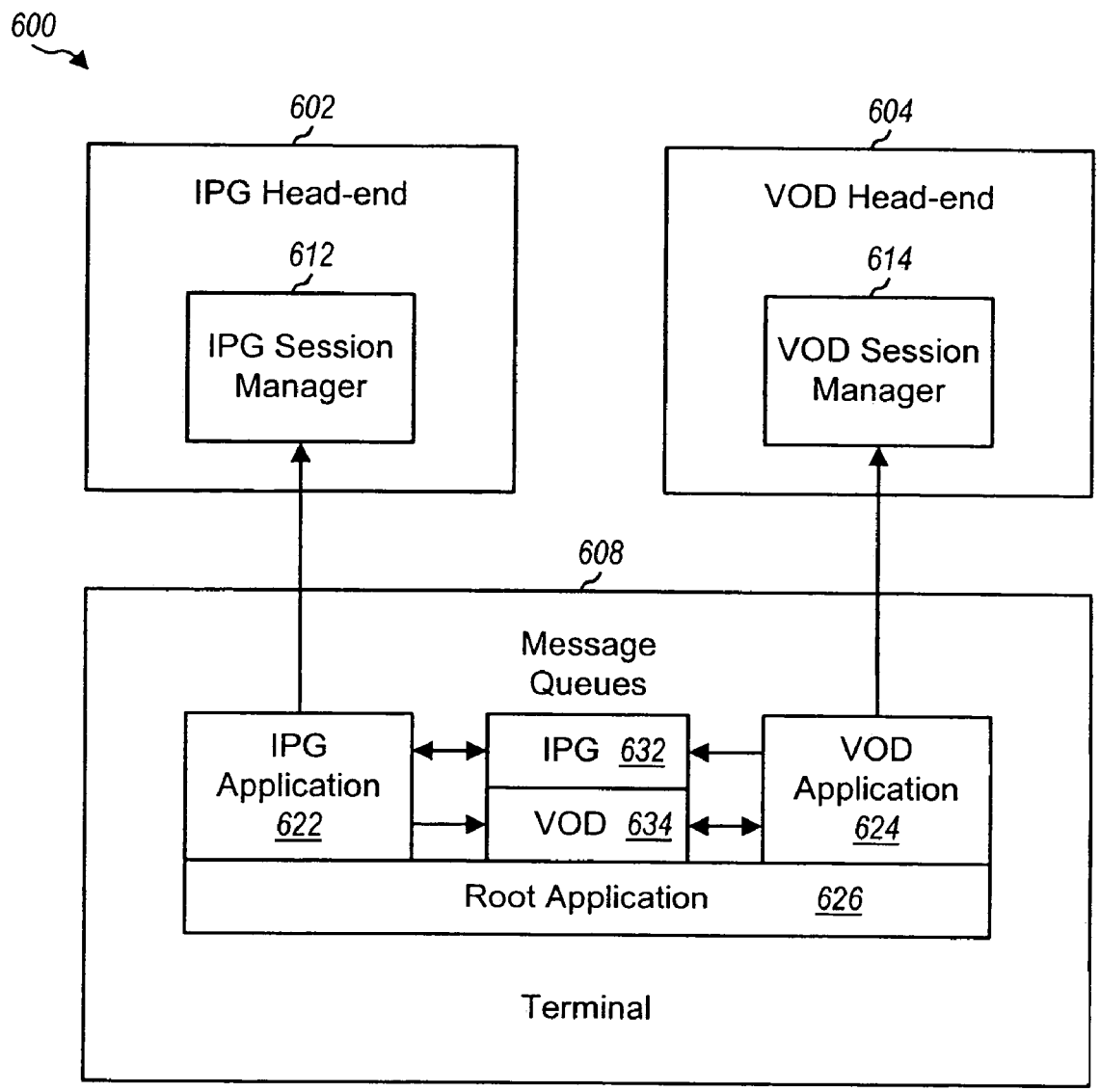
FIG. 6 is a block diagram of an embodiment of an information distribution system capable of providing IPG and VOD services to a number of terminals.

FIG. 6 is a block diagram of an embodiment of an information distribution system 600 capable of providing IPG and VOD services to a number of terminals. System 600 includes an IPG head-end 602 (i.e., an IPG server) and a VOD head-end 604 configured to provide IPG and VOD services, respectively, to a number of terminals 608 (only one terminal is shown in FIG. 6 for simplicity). Terminal 608 is capable of providing IPG and VOD user interfaces and is further capable of implementing various aspects of the invention In the specific embodiment shown in FIG. 6, terminal 608 includes an IPG application 622 and a VOD application 624 executing on top of a root application 626. Terminal 608 communicates with an IPG session manager 612 within IPG head-end 602 via IPG application 622 and further communicates with a VOD session manager 614 within VOD head-end 604 via VOD application 624.

IPG application 622 is responsible for providing IPG service to a viewer at terminal 608. This may be achieved via an IPG user interface, an implementation of which is described above and in the aforementioned U.S. Pat. Nos. 6,208,355 and 6,754,905. IPG application 622 allows a viewer to browse through a number of guide pages for programming for a number of broadcast channels. The viewer is further able to view guide listings for a particular type of channels or programming (e.g., Movies, Kids, Sports, and so on) or for the viewer's defined set of channels (e.g., Favorites). In an embodiment, the viewer is also able to launch (i.e., activate) VOD application 624 from IPG application 622. This activation of the VOD user interface may be achieved, for example, (1) by selecting a VOD icon provided in the IPG menu, (2) by pressing a particular key on a remote control unit, or (3) via some other mechanism.

VOD application 624 is responsible for providing VOD service to the viewer. This may be achieved via a VOD user interface, an implementation of which is described in the aforementioned U.S. Pat. No. 6,208,335. In an embodiment, VOD application 624 provides VOD service requests and VCR stream control requests to VOD server 614. The requests may be sent from terminal 608 to VOD head-end 604 via, for example, an upstream path of an out-of-band network and using a particular protocol such as, for example, UDP over IP. The responses from VOD head-end 604 (possibly excluding the video and bitmap data) may be sent to terminal 608 via, for example, a downstream path of the out-of-band network. Video and bitmap data may be sent to terminal 608 via, for example, an in-band network.

In an aspect, terminal 608 further includes a number of message queues used to store messages in support of the IPG and VOD applications. As shown in FIG. 6, an IPG message queue 632 stores messages for IPG application 622 and a VOD message queue 634 stores messages for VOD application 624. Additional message queues may be provided for additional applications executing at terminal 608. The message queues may be used by each application to communicate with the other applications, to request information and status from the other applications, and to pass control between applications, as described below.

In an embodiment, root application 626 at terminal 608 (which is akin to an operating system for a computer system) coordinates the communication between higher layer software applications (e.g., the IPG and VOD applications) and lower layer hardware. Root application 626 may support a particular set of application programming interfaces (APIs) via which the higher layer software applications communicate with and access lower layer resources. Root application 626 is typically active whenever the terminal is powered on.

In one embodiment, only one higher layer application (e.g., either the IPG or VOD application) is active at any given moment and responsible for providing the basic interface with the viewer. The other application(s) are dormant until launched by the active application. In another embodiment, multiple higher layer applications may be active (or semi-active) concurrently. In this embodiment, where both applications may be active or semi-active, the applications may be designed with the capability to overlay a part of the IPG user interface and/or a spotlight window on top of a VOD user interface, and/or to overlay a part of the VOD user interface on top of the IPG user interface. Any sub-region of the IPG may be overlayed on top of the VOD user interface using, for example, slice-based encoding methods described in the aforementioned U.S. Pat. No. 6,754,271. Main IPG user interface modules, such as a spotlight window, may also be overlayed on top of VOD user interface based on any of the encoding and delivery techniques described in the aforementioned U.S. patent application Ser. No. 09/691,495.

In an embodiment, IPG application 622 and VOD application 624 are implemented as separate downloadable executable object files. Each of the IPG and VOD applications may be executed individually and separately, and does not need resources or support from the other application. However, when both applications are present at the terminal, each application provides the appropriate means to send and receive messages to and from the message queue maintained for that application. This interface design supports flexible communication between the applications. In this manner, each application may be executed and terminated independently of the other application, and also has a lifetime that is independent of the other application.

Since each application may be executed and released separately, no assumptions are typically made with respect to the availability or responsiveness of the other application. Each application is capable of handling message delivery failures or errors. In an embodiment, if the IPG or VOD application fails, it releases all resources before exiting.

Figure 7:
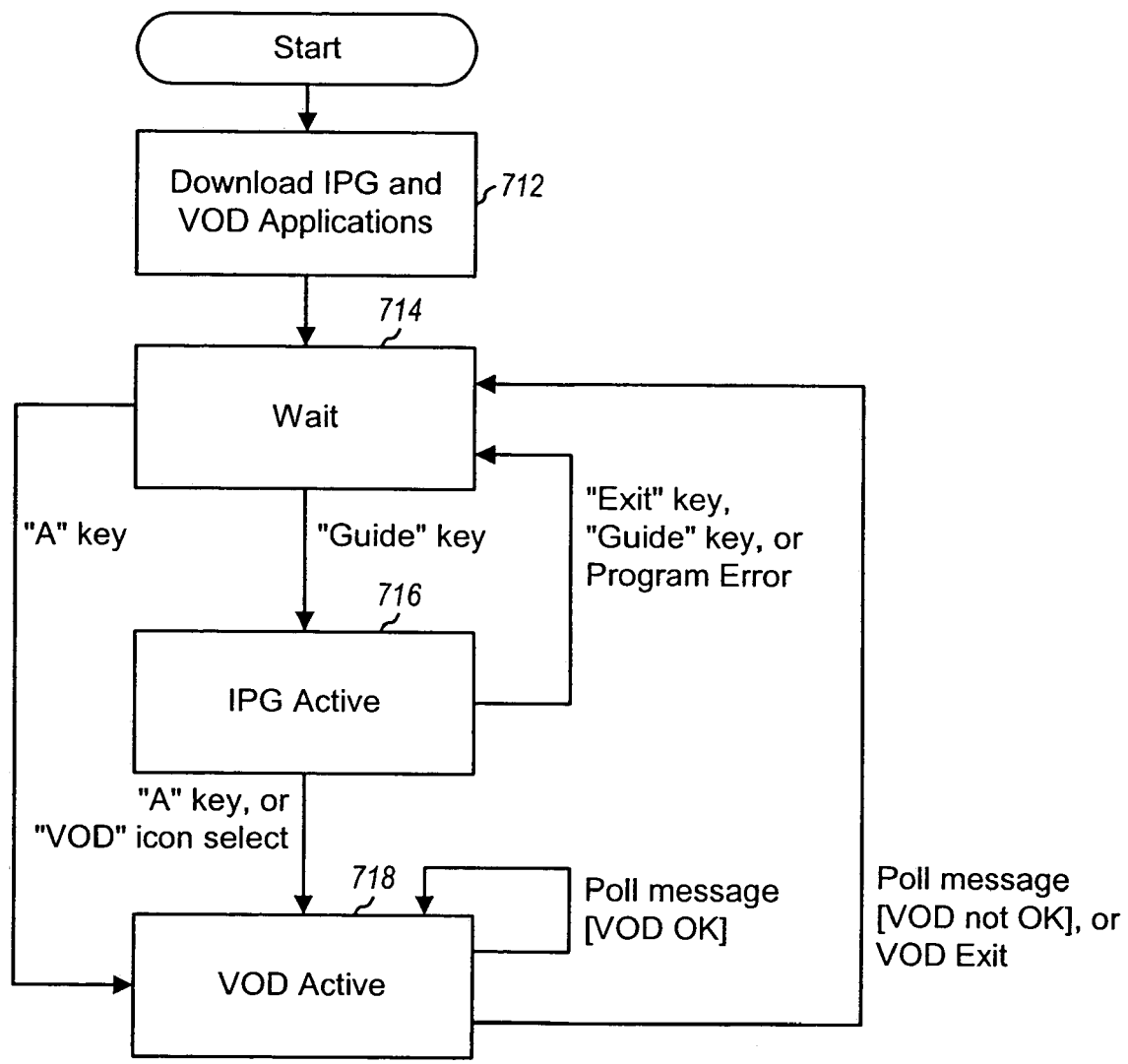
FIG. 7 is a state diagram of the operational states of the IPG and VOD applications at the terminal.

FIG. 7 is a state diagram of the operational states of the IPG and VOD applications at the terminal. Initially, in state 712, the IPG and/or VOD applications are downloaded to the terminal. After the applications are downloaded, the terminal enters a wait state 714. In the specific implementation shown in FIG. 7, while in wait state 714, a "Guide" key press (e.g., on the remote control unit) causes a transition to an IPG active state 716 and an "A" key press causes a transition to a VOD active state 718. IPG active state 716 is indicative of the IPG application being active, and VOD active state 718 is indicative of the VOD application being active.

While in IPG active state 716, a "Guide" or "Exit" key press or a program error causes a transition back to wait state 714. Also while in IPG active state 716, the IPG application launches the VOD application and the terminal transitions to VOD active state 718 if the viewer selects the VOD service by pressing the "A" key or selecting a "VOD" icon in the IPG user interface.

While in VOD active state 718, the terminal transitions back to wait state 714 if the VOD application exits or if a poll message is not properly responded to, as described below. Although not shown in FIG. 7, the terminal may be allowed to transition from VOD active state 718 to IPG active state 716 in response to, e.g., a particular key press, selection of an (IPG) icon in the VOD user interface, or via some other means.

The state diagram in FIG. 7 includes a number of states for the terminal and a number of "events" for transitioning between the states. The events may correspond to key presses, receipt and/or execution of messages, viewer selections (e.g., of the IPG and VOD icons), program execution status, other events, or a combination thereof. Additional and/or different states may be provided for the terminal, and additional and/or different events may be provided for transitioning between the states, and these variations are within the scope of the invention.

In an embodiment, the IPG application can execute in either a foreground or background mode. The IPG application enters the foreground mode and assumes control of the user interface for the terminal if it receives a "Launch" message on its message queue. And in the background mode, the IPG application defers the handling of key presses to the VOD or some other active application.

Similarly, the VOD application can execute in either a foreground or background mode. The VOD application enters the foreground mode and supports VOD service when it receives a Launch message on its message queue. In the background mode, the VOD relinquishes resources and waits for selection and launch (e.g., by the viewer).

The Launch message may be received by the IPG and VOD applications in response to respective sets of defined events. For example, the IPG application may receive the Launch message in response to a "Guide" key press, selection of an IPG icon (e.g., in the VOD user interface), and so on. Similarly, the VOD application may receive the Launch message in response to an "A" key press, selection of a VOD icon (e.g., in the IPG user interface), and so on. Each application may be launched by selection of an icon (i.e., a link) provided in the other user interface, a particular set of key presses, and so on.

In an embodiment, a poll mechanism is used to determine the status of the applications executing at the terminal. For example, a "Poll" message may cause the IPG application to echo a response back to the sender of the message. This allows the sender to ascertain whether or not the IPG application is currently in the foreground (active) or background (passive) state. If the IPG application is currently in a wait-for-launch (background) state, it responds with a status parameter set to "Passive". Otherwise, the IPG application responds with the status parameter set to "Active".

When the IPG application is in the foreground mode, the VOD application is inactive and in the wait-for-launch state. And when the IPG application is in the background mode, the VOD application may or may not be active. The IPG application remains in the background mode until (1) it receives a Launch message in its message queue, (2) it determines that the VOD application is no longer active via an inappropriate poll response (or lack of a response), or (3) if the terminal is reset.

To launch the VOD application, the IPG application sends a Launch message to the VOD application with the keycode parameter set to indicate, e.g., either the last key pressed or an "A" key if an icon is selected. The IPG application then enters the background mode.

In an embodiment, while in VOD active state 718, termination of the VOD application causes a Launch message to be sent to the IPG application. This Launch message indicates, through a keycode parameter, the conditions of the VOD application's exit. The Launch message may be sent for various situations, three of which are provided as examples. First, if the viewer presses a key that the VOD application does not handle or recognize, the VOD application can send the key to the IPG application in the Launch message and then exit. Second, if the viewer selects the "Guide" icon from the VOD user interface, the VOD application can send the IPG application a Launch message with the keycode parameter set to "Menu" and then exit. And third, if the VOD application exits back to the television-viewing mode or exits due to an error condition, it can send the IPG application the Launch message with the keycode parameter set to "Exit". For all three cases, the IPG application assumes that the VOD application has tuned away from any hidden VOD service channel.

In an embodiment, the IPG application sends a "Reminder" message to the VOD application if the VOD application is active and a reminder is pending. The Reminder message instructs the VOD application to display a message on the screen and to exit to the IPG application if the viewer presses a specific exit key before the message times out. If the message times out, the VOD application removes the message from the screen and ceases to monitor the specific exit key.

With the IPG and VOD applications executing as described herein (e.g., either only one application is active at a time, or both applications concurrently active, depending on the particular design), a user interface can be designed to overlay IPG and/or a spotlight window on top of the VOD user interface, and vice versa. The terminal may be designed to support the following features:

The IPG application assumes control of the terminal when it receives a Launch message on its message queue.

The IPG application sends a Launch message to the VOD application with the keycode parameter set to "A" and then transitions to the background mode if the viewer selects the VOD icon from the IPG user interface menu, the guide or menu screen, or the IPG application.

The IPG application sends a Launch message to the VOD application with the keycode parameter set to the most recently pressed numeric key or the "Enter" key and then transitions to the background mode if the viewer enters the VOD application's "tunable" channel number.

The IPG application sends a Launch message to the VOD application with the keycode parameter set to "Channel Up", "Channel Down", "Favorites", or "Last" and then transitions to the background mode if the viewer selects the VOD service via the "Channel Up", "Channel Down", "Favorites", or "Last" key, respectively.

The IPG application sends a Reminder message to the VOD application with, e.g., a 32-character maximum text string, a message duration value (e.g., in seconds and not exceeding 30 seconds), and the keycode of an exit-to-reminder key when a reminder notification is pending. The exit-to-reminder key may be either the "Exit" key or the "Guide" key.

The IPG application exits when it receives an Exit message on its message queue.

The IPG application responds with its status when it receives a Poll message on its message queue.

The IPG application sends a Poll message response to the VOD application with the response parameter set to "Active" or "Passive" if the IPG application is running in the foreground or is in the wait-for-launch state, respectively.

The IPG application monitors an unsolicited message queue.

The IPG application is control manager compliant.

The IPG application handles all key presses, as appropriate, when the VOD application is not active.

The IPG application implements an application-messaging queue with a system-wide unique name.

The IPG application is able to display a selectable VOD icon in the IPG menu and/or a selectable VOD channel listing in the guide region of the IPG menu.

For clarity, various aspects of the invention are specifically described for IPG and VOD user interfaces and IPG and VOD services. These techniques may also be used for numerous other types of information distribution system, such as data delivery systems, program delivery systems, and so on, and for other user interfaces.

The foregoing description of the preferred embodiments is provided to enable any person skilled in the art to make or use the invention. Various modifications to these embodiments will be readily apparent to those skilled in the art, and the generic principles defined herein may be applied to other embodiments without the use of the inventive faculty. Thus, the invention is not intended to be limited to the embodiments shown herein but is to be accorded the widest scope consistent with the principles and novel features disclosed herein.

What is claimed is:

1. A terminal for providing a user interface for supporting interactive media services, comprising:
   a memory configured to store data; and
   a processor, coupled to the memory, the processor operating on data in the memory;
   wherein the processor is configured to provide:
   a first application, operating at a first layer, for supporting a first type of service and for communicating with a first server at a headend supporting the first type of service;
   a second application, operating at the same first layer as the first application, for supporting a second type of service and for communicating with a second server at a headend supporting the second type of service, wherein the first application and the second application communicate, but execute independently;
a first application message queue, coupled to the first and second application and operating at the same first layer as the first and second application, for receiving messages from the second application and for receiving and forwarding messages to the first application,
a second application message queue, coupled to the first and second application and operating at the same first layer as the first and second application, for receiving messages from the first application and for receiving messages from and forwarding messages to the second application the first and second application message queue passing control between the first application and the second application using messages;
a root application, coordinating communication between the first and second applications and lower layer resources, the first and second application executing on top of the root application;
wherein the first application and the second application each implement a wait state and an active state set by triggering events, and wherein the processor presents a user interface on a display for the first application and the second application, wherein the first application and the second application transition from an active state to a wait state in response to an exit triggering event and when the first and second application do not properly respond to a message polling a status of the first and second application, state status being communicated between the first and second application using the first and second application message queues, and wherein the first application executes in a foreground mode when in an active state and the second application executes in a background mode when in a wait state, the first application in the active state assuming control of a user interface and the second application in the wait state defers responding to events to the first application in the active state; and
wherein the processor receives user input for controlling the first and second applications via the user interface and for transitioning the first and second applications between active and wait states; and
wherein the first and second applications consist of applications selected from an interactive program guide (IPG) application and a video-on-demand (VOD) application.

2. The terminal of claim 1, wherein the overlay delivery is selected by causing both the first and second applications to be active.

3. The terminal of claim 1, wherein the control mechanism causes a first application to enter an active state in response to a signal associated with the first application.

4. The terminal of claim 1, wherein the control mechanism causes a first application to enter an active state in response to a signal indicative of an activation of a remote control key associated with the first application.

5. The terminal of claim 1, wherein the root application comprises a common platform adapted to enable the execution of the first and second applications.

6. The terminal of claim 1, wherein imagery associated with an active application is emphasized with respect to imagery associated with an inactive application in the wait state.

7. A non-transitory computer readable medium for storing instructions which, when executed by a processor, perform a method, comprising:

configuring a memory to store data; and
processing data in the memory by a processor to implement:
a first application, operating at a first layer, for supporting a first type of service and for communicating with a first server at a headend supporting the first type of service;
a second application, operating at the same first layer as the first application, for supporting a second type of service and for communicating with a second server at a headend supporting the second type of service, wherein the first application and the second application communicate, but execute independently;
a first application message queue, coupled to the first and second application and operating at the same first layer as the first and second application, for receiving messages from the second application and for receiving and forwarding messages to the first application,
a second application message queue, coupled to the first and second application and operating at the same first layer as the first and second application, for receiving messages from the first application and for receiving messages from and forwarding messages to the second application, the first and second application message queue passing control between the first application and the second application using messages;
a root application, coordinating communication between the first and second applications and lower layer resources, the first and second application executing on top of the root application;
wherein the first application and the second application each implement a wait state and an active state set by triggering events, and wherein the processor presents a user interface on a display for the first application and the second application, wherein the first application and the second application transition from an active state to a wait state in response to an exit triggering event and when the first and second application do not properly respond to a message polling a status of the first and second application, state status being communicated between the first and second application using the first and second application message queues, and wherein the first application executes in a foreground mode when in an active state and the second application executes in a background mode when in a wait state, the first application in the active state assuming control of a user interface and the second application in the wait state defers responding to events to the first application in the active state; and
receiving user input at the processor for controlling the first and second applications via the user interface and for transitioning the first and second applications between active and wait states;
wherein the first and second applications consist of applications selected from an interactive program guide (IPG) application and a video-on-demand (VOD) application.

8. The non-transitory computer readable medium of claim 7 further comprising selecting the overlay delivery by causing both the first and second applications to be active.

9. The non-transitory computer readable medium of claim 7 further comprising causing the first application to enter an active state in response to a signal associated with the first application.

10. The non-transitory computer readable medium of claim 7 further comprising causing the first application to enter an active state in response to a signal indicative of an activation of a remote control key associated with the first application.

11. The non-transitory computer readable medium of claim 7 further comprising executing the first and second applications via the root application using a common platform.

12. The non-transitory computer readable medium of claim 7 further comprising emphasizing imagery associated with an active application with respect to imagery associated with an application in the wait state.

13. A method for providing multiple session-based services at a terminal, comprising:
   configuring a memory to store data; and
   processing data in the memory by a processor to implement:
   a first application, operating at a first layer, for supporting a first type of service and for communicating with a first server at a headend supporting the first type of service;
   a second application, operating at the same first layer as the first application, for supporting a second type of service and for communicating with a second server at a headend supporting the second type of service, wherein the first application and the second application communicate, but execute independently;
   a first application message queue, coupled to the first and second application and operating at the same first layer as the first and second application, for receiving messages from the second application and for receiving and forwarding messages to the first application,
   a second application message queue, coupled to the first and second application and operating at the same first layer as the first and second application, for receiving messages from the first application and for receiving messages from and forwarding messages to the second application, the first and second application message queue passing control between the first application and the second application using messages;
   a root application, coordinating communication between the first and second applications and lower layer resources, the first and second application executing on top of the root application;
   wherein the first application and the second application each implement a wait state and an active state set by triggering events, and wherein the processor presents a user interface on a display for the first application and the second application, wherein the first application and the second application transition from an active state to a wait state in response to an exit triggering event and when the first and second application do not properly respond to a message polling a status of the first and second application, state status being communicated between the first and second application using the first and second application message queues, and wherein the first application executes in a foreground mode when in an active state and the second application executes in a background mode when in a wait state, the first application in the active state assuming control of a user interface and the second application in the wait state defers responding to events to the first application in the active state; and
   receiving user input at the processor for controlling the first and second applications via the user interface and for transitioning the first and second applications between active and wait states;
   wherein the first and second applications consist of applications selected from an interactive program guide (IPG) application and a video-on-demand (VOD) application.

14. The method of claim 13 further comprising selecting the overlay delivery by causing both the first and second applications to be active.

15. The method of claim 13 further comprising causing the first application to enter an active state in response to a signal associated with the first application.

16. The method of claim 13 further comprising causing the first application to enter an active state in response to a signal indicative of an activation of a remote control key associated with the first application.

17. The method of claim 13 further comprising executing the first and second applications via the root application using a common platform.

18. The method of claim 13 further comprising emphasizing imagery associated with an active application with respect to imagery associated with an application in the wait state.

* * * * *